(12) United States Patent
Jolly et al.

(10) Patent No.: US 11,201,337 B2
(45) Date of Patent: Dec. 14, 2021

(54) SYSTEM AND METHOD FOR REMOVING WATER AND HYDROGEN FROM ANODE EXHAUST

(71) Applicant: FuelCell Energy, Inc., Danbury, CT (US)

(72) Inventors: Stephen Jolly, Southington, CT (US); Frank J. Chimbole, Jr., Danbury, CT (US); Fred C. Jahnke, Rye, NY (US); Jonathan Malwitz, Danbury, CT (US); Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 97 days.

(21) Appl. No.: 16/229,285

(22) Filed: Dec. 21, 2018

(65) Prior Publication Data

US 2020/0203738 A1  Jun. 25, 2020

(51) Int. Cl.
*H01M 8/0668* (2016.01)
*H01M 8/0662* (2016.01)
(Continued)

(52) U.S. Cl.
CPC ... *H01M 8/04149* (2013.01); *H01M 8/04164* (2013.01); *H01M 8/04514* (2013.01);
(Continued)

(58) Field of Classification Search
None
See application file for complete search history.

(56) References Cited

U.S. PATENT DOCUMENTS 6,264,828 B1 * 7/2001 Baker .................. C10G 49/007
                                                       208/100
7,150,927 B2   12/2006 Hickey et al.
(Continued)

FOREIGN PATENT DOCUMENTS

EP   1207132 A1 *  5/2002  ............. C10J 3/721
EP   1 620 906     2/2006
EP   1 665 441     6/2006

OTHER PUBLICATIONS

Chiesa, Paolo, Matteo Carmelo Romano, and T. G. Kreutz. "Use of membranes in systems for electric energy and hydrogen production from fossil fuels." Handbook of Membrane Reactors. Woodhead Publishing, 2013. 416-455. (Year: 2013).*

(Continued)

*Primary Examiner* — Ula C Ruddock
*Assistant Examiner* — Amanda Rosenbaum
(74) *Attorney, Agent, or Firm* — Foley & Lardner LLP

(57) ABSTRACT

A fuel cell system includes an anode configured to output an anode exhaust stream comprising hydrogen, carbon dioxide, and water; and a membrane dryer configured to receive the anode exhaust stream, remove water from the anode exhaust stream, and output a membrane dryer outlet stream. The membrane dryer includes a first chamber configured to receive the anode exhaust stream; a second chamber configured to receive a purge gas; and a semi-permeable membrane separating the first chamber and the second chamber. The semi-permeable membrane is configured to allow water to diffuse therethrough, thereby removing water from the anode exhaust stream. The membrane dryer may further be configured to remove hydrogen from the anode exhaust stream.

9 Claims, 6 Drawing Sheets

(51) Int. Cl.
  *H01M 8/04828* (2016.01)
  *H01M 8/04492* (2016.01)
  *H01M 8/04119* (2016.01)
  *H01M 8/04089* (2016.01)
  *B01D 53/26* (2006.01)
  *B01D 53/00* (2006.01)

(52) U.S. Cl.
  CPC ..... *H01M 8/04843* (2013.01); *H01M 8/0668* (2013.01); *H01M 8/0687* (2013.01)

(56) References Cited

U.S. PATENT DOCUMENTS

| | | | |
|---|---|---|---|
| 7,201,979 B2 | 4/2007 | Mcelroy et al. | |
| 7,364,810 B2 | 4/2008 | Sridhar et al. | |
| 7,396,603 B2 | 7/2008 | Farooque et al. | |
| 7,422,810 B2 | 9/2008 | Venkataraman et al. | |
| 7,482,078 B2 | 1/2009 | Sridhar et al. | |
| 7,575,822 B2 | 8/2009 | Mitlitsky et al. | |
| 7,704,618 B2 | 4/2010 | Venkataraman et al. | |
| 7,781,112 B2 | 8/2010 | Sridhar et al. | |
| 7,833,668 B2 | 11/2010 | Ballantine et al. | |
| 7,846,599 B2 | 12/2010 | Ballantine et al. | |
| 7,878,280 B2 | 2/2011 | Sridhar et al. | |
| 7,887,971 B2 | 2/2011 | Hickey et al. | |
| 7,901,814 B2 | 3/2011 | Venkataraman et al. | |
| 8,053,136 B2 | 11/2011 | Hickey et al. | |
| 8,071,241 B2 | 12/2011 | Sridhar et al. | |
| 8,071,246 B2 | 12/2011 | Mitlitsky et al. | |
| 8,277,992 B2 | 10/2012 | Mitlitsky et al. | |
| 8,435,689 B2 | 5/2013 | Venkataraman et al. | |
| 8,663,859 B2 | 3/2014 | Mitlitsky et al. | |
| 8,852,820 B2 | 10/2014 | Perry et al. | |
| 9,190,693 B2 | 11/2015 | Sridhar et al. | |
| 9,413,017 B2 | 8/2016 | Bandhauer et al. | |
| 9,722,273 B2 | 8/2017 | Perry et al. | |
| 9,911,989 B2 | 3/2018 | Mcelroy et al. | |
| 9,947,955 B2 | 4/2018 | Sridhar et al. | |
| 10,096,840 B1 | 10/2018 | Venkataraman et al. | |
| 10,361,442 B2 | 7/2019 | Perry et al. | |
| 10,581,090 B2 | 3/2020 | Ballantine et al. | |
| 2004/0142220 A1* | 7/2004 | Brenner | B01J 19/2475 429/411 |
| 2006/0115691 A1* | 6/2006 | Hilmen | H01M 8/243 429/411 |
| 2007/0269690 A1* | 11/2007 | Doshi | C01B 3/503 48/197 R |
| 2010/0266923 A1 | 10/2010 | Mcelroy et al. | |
| 2011/0189567 A1 | 8/2011 | Venkataraman et al. | |
| 2012/0118011 A1* | 5/2012 | Terrien | B01D 53/002 62/619 |
| 2013/0108936 A1* | 5/2013 | McElroy | H01M 8/04097 429/410 |
| 2014/0260310 A1* | 9/2014 | Berlowitz | F02C 3/22 60/780 |
| 2015/0093676 A1* | 4/2015 | Berlowitz | F01K 5/02 429/464 |
| 2016/0329582 A1* | 11/2016 | Buxbaum | H01M 8/04156 |
| 2020/0161671 A1 | 5/2020 | Ballantine et al. | |

OTHER PUBLICATIONS

International Search Report and Written Opinion in PCT/IB2019/060871, dated Apr. 8, 2020 (16 pages).

* cited by examiner

SYSTEM AND METHOD FOR REMOVING WATER AND HYDROGEN FROM ANODE EXHAUST

STATEMENT OF GOVERNMENT RIGHTS

This invention was made with government support under Cooperative Agreement DE-FE0026580 awarded by the U.S. Department of Energy. The government has certain rights in this invention.

BACKGROUND

The present disclosure relates to fuel cell systems for the production of electricity. In particular, the present disclosure relates to a fuel cell system including a system and method for removing water and hydrogen from anode exhaust.

Fuel cells are devices that are capable of converting chemical energy stored in a fuel, such as a hydrocarbon fuel, into electrical energy through electrochemical reactions. In general, a fuel cell comprises an anode, an electrolyte layer, and a cathode. The electrolyte layer serves to transfer ions between the anode and the cathode, which facilitate reactions within the anode and the cathode to generate electrons for the production of electricity. Anode exhaust, which may comprise a mixture of hydrogen, carbon monoxide, and carbon dioxide, is produced as a byproduct from the anode of the fuel cell. The anode exhaust contains useful byproduct gases such as hydrogen and carbon monoxide, which can be exported as syngas for other uses, such as fuel for the fuel cell or feed for other chemical reactions. However, to prepare the anode exhaust to be suitable for such uses, most of the carbon dioxide present in the anode exhaust must be removed.

One method to remove the $CO_2$ from the anode exhaust is to pressurize and cool the gas to condense the carbon dioxide into a liquid. The liquid carbon dioxide is then easily removed using a separator or "knockout" vessel. To condense the majority of the carbon dioxide, the stream must be cooled below the freezing temperature of water. To avoid problems with ice in the heat exchangers and other equipment, it is desirable to remove the water in the gas prior to cooling.

In some systems, water is removed from the anode exhaust using a regenerative desiccant bed dryer prior to final purification and removal of the carbon dioxide. Referring to FIG. 6, a regenerative desiccant bed dryer includes a first bed that is "ON" and engaged in anode gas drying, and a second bed that is "OFF" and engaged in bed regeneration. The first bed and the second bed may be provided, for example, in the form of dual tower desiccant air dryers. The first bed and the second bed include a desiccant. In operation, the first bed is "ON" and water vapor in the anode exhaust moves into an area of lower water vapor concentration in the pores of the desiccant of the first bed, causing water vapor to accumulate on a surface of the desiccant. The accumulation of water on the surface of the desiccant dries the anode exhaust. During this process, the second bed is "OFF" such that the desiccant in the second bed can be regenerated. As water vapor accumulates, the water vapor changes phase and becomes liquid water. This process continues as long as the concentration of the water vapor in the anode exhaust is greater than a concentration of the water vapor in the desiccant pores. The liquid water remains on the surface of the desiccant of the first bed until saturation, at which point the liquid water is stripped off. Once the liquid water of the first bed is stripped off, the first bed is switched "OFF" such that the desiccant in the first bed can be regenerated, while the second bed is switched "ON" such that the second bed is drying the anode exhaust. In other words, the first bed and the second bed cycle between a drying ("ON") and a regeneration ("OFF") process that switches per cycle. Only water is removed by the regenerative desiccant bed dryer.

A need exists for technology for removing water from an anode exhaust stream prior to final purification and removal of the carbon dioxide to promote the overall efficiency of the carbon capture system and carbon dioxide recovery. Removal of hydrogen also benefits the process as this increases the concentration of carbon dioxide and the amount of carbon dioxide condensed at a given temperature and pressure. Another benefit of removal of hydrogen is the reduced mass loading to downstream processes that in turn reduces the parasitic power of those processes and reduces the size of piping, valves and vessels. Also, a non-cycling system is desirable to simplify the operation and reduce maintenance.

SUMMARY

In certain embodiments, a fuel cell system includes an anode configured to output an anode exhaust stream comprising hydrogen, carbon dioxide, and water; and a membrane dryer configured to receive the anode exhaust stream, remove water from the anode exhaust stream, and output a membrane dryer outlet stream. The membrane dryer includes a first chamber configured to receive the anode exhaust stream; a second chamber configured to receive a purge gas; and a semi-permeable membrane separating the first chamber and the second chamber. The semi-permeable membrane is configured to allow water to diffuse therethrough, thereby removing water from the anode exhaust stream.

In some aspects, the membrane dryer outlet stream may have less than 0.001% water.

In some aspects, the membrane dryer may be further configured to remove hydrogen from the anode exhaust stream. The semi-permeable membrane may be further configured to allow hydrogen to diffuse therethrough, thereby removing hydrogen from the anode exhaust stream. The semi-permeable membrane may be selected to preferentially allow water, then hydrogen, then carbon dioxide, then carbon monoxide, and then nitrogen to diffuse therethrough.

In some aspects, the second chamber of the membrane dryer may be configured to output a process recycle stream including the purge gas, hydrogen that diffused through the semi-permeable membrane, and water that diffused through the semi-permeable membrane.

In some aspects, the fuel cell system may further include a carbon dioxide liquefaction system configured to liquefy carbon dioxide in the membrane dryer outlet stream. In some aspects, the fuel cell system may further include a liquid carbon dioxide separator configured to separate liquefied carbon dioxide from the membrane dryer outlet stream, thereby producing a carbon dioxide-lean off gas stream and a high purity liquid carbon dioxide stream. In some aspects, the liquid carbon dioxide separator may be part of the carbon dioxide liquefaction system. In other aspects, the liquid carbon dioxide separator may be separately provided from the carbon dioxide liquefaction system.

In some aspects, the fuel cell system may further include a heat exchanger configured to heat the carbon dioxide-lean off gas stream and introduce the heated, carbon dioxide-lean off gas stream into the membrane dryer as the purge gas.

In some aspects, the fuel cell system may further include a heat exchanger configured to cool the pressurized anode exhaust feed to the dryer to above the freezing temperature of water, with a system to remove the liquid water and minimize the amount of water fed to the dryer.

In some aspects, the fuel cell system may further include an anode gas compressor located downstream of the anode. The anode gas compressor may be configured to compress the anode exhaust stream upstream of the membrane dryer.

In some aspects, the fuel cell system may further include at least one additional membrane dryer. In some aspects, the membrane dryer and the at least one additional membrane dryer may be connected in parallel. In other aspects, the membrane dryer and the at least one additional membrane dryer may be connected in series. In aspects in which more than two membrane dryers are provided, all of the membrane dryers may be connected in parallel; all of the membrane dryers may be connected in series; or some of the membrane dryers may be connected in parallel, while some of the membrane dryers may be connected in series (i.e., a combination of membrane dryers connected in parallel and membrane dryers connected in series).

In certain embodiments, a method of removing water from an anode exhaust stream includes receiving an anode exhaust stream comprising hydrogen, carbon dioxide, and water in a first chamber of a membrane dryer; receiving a purge gas in a second chamber of the membrane dryer; and removing water from the anode exhaust stream by diffusion across a semi-permeable membrane separating the first chamber and the second chamber.

In some aspects, the method may further include removing hydrogen from the anode exhaust stream by diffusion across the semi-permeable membrane separating the first chamber and the second chamber. The semi-permeable may be selected to preferentially allow water and then hydrogen to diffuse therethrough.

In some aspects, the method may further include liquefying carbon dioxide in the membrane dryer outlet stream. The method may further include separating liquefied carbon dioxide from the membrane dryer outlet stream, thereby producing a carbon dioxide-lean off gas stream and a high purity liquid carbon dioxide stream.

In some aspects, the method may further include heating the carbon dioxide-lean off gas stream; and introducing the heated, carbon dioxide-lean off gas stream into the membrane dryer as the purge gas.

In some aspects, the method may further include compressing the anode exhaust stream upstream of the membrane dryer.

It should be appreciated that all combinations of the foregoing aspects and additional aspects discussed in greater detail below (provided such aspects are not mutually inconsistent) are contemplated as being part of the subject matter disclosed herein. In particular, all combinations of claimed subject matter appearing at the end of this disclosure are contemplated as being part of the subject matter disclosed herein.

These and other advantageous features will become apparent to those reviewing the disclosure and drawings.

DETAILED DESCRIPTION

Figure 1:
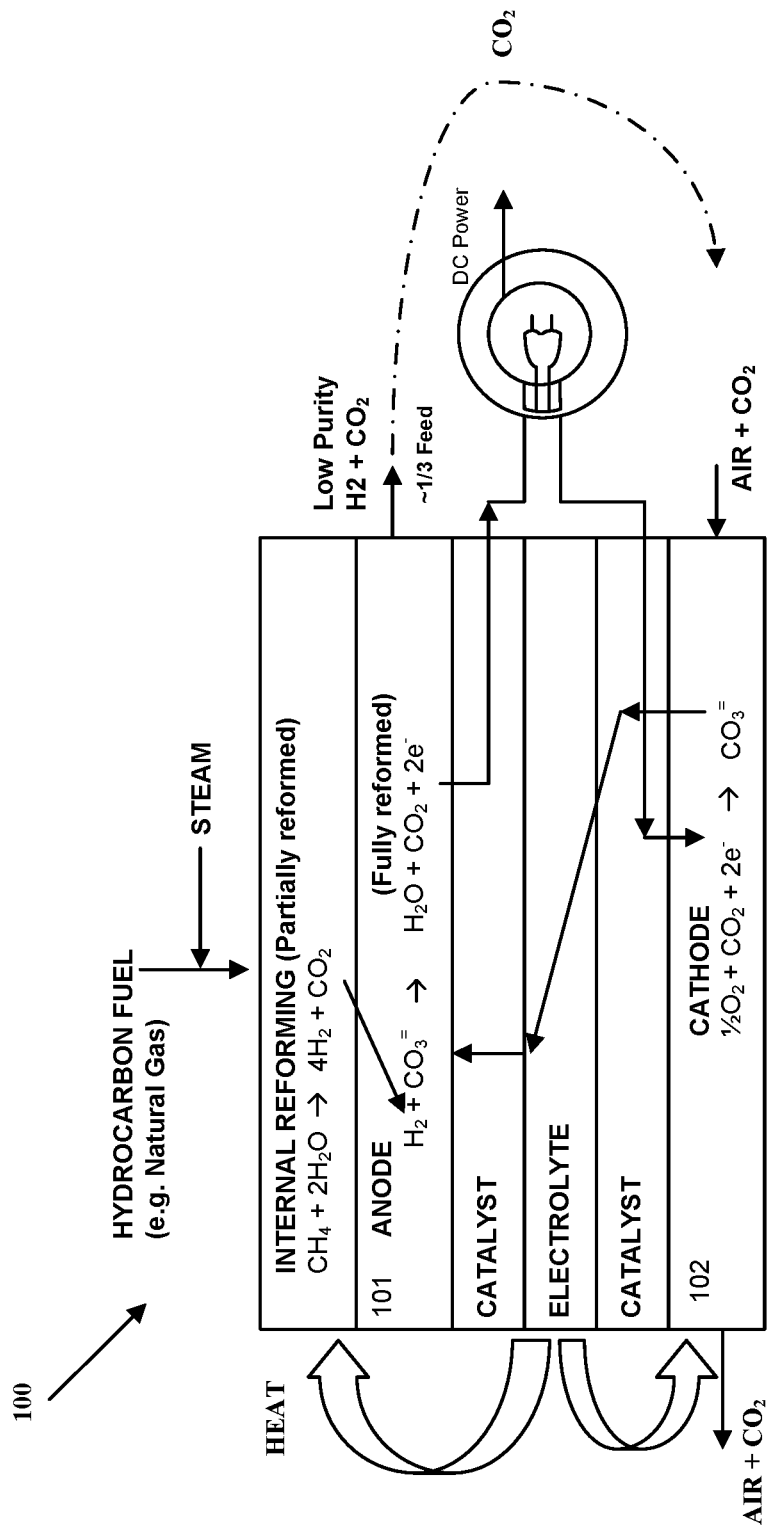
FIG. 1 illustrates the operation of an internal reforming fuel cell.

Referring to the figures in general, a fuel cell system includes at least one fuel cell. In some aspects, as illustrated in the example of FIG. 1, the fuel cell 100 is an internally reforming fuel cell. Steam and hydrocarbon fuel (for example, natural gas, biomass derived syngas, or biogas (e.g., anaerobic digester gas)) flow into an indirect internal reformer where it is partially reformed according to the following equation:

$$CH_4 + 2H_2O \rightarrow 4H_2 + CO_2 \tag{1}$$

The partially reformed fuel then enters an anode 101 of the fuel cell 100, where it is further reformed by a direct internal reforming catalyst (DIR catalyst) provided within the anode compartment. As the hydrogen is removed from the system and water is added according to the equation (2), it forces the reforming reaction shown in equation (1) towards completion, converting almost all of the methane to hydrogen and carbon dioxide.

$$H_2 + CO_3^{2-} \rightarrow H_2O + CO_2 + 2e^- \tag{2}$$

Carbon dioxide recycled from the anode 101 and air are supplied to a cathode 102. Flue gas from a power plant containing $CO_2$ may also be sent to the cathode 102 to provide carbon dioxide to the cathode 102. Thus, in Equation (3), the $CO_3^{2-}$ is produced by the cathode according to the equation:

$$\tfrac{1}{2}O_2 + CO_2 + 2e^- \rightarrow CO_3^{2-} \tag{3}$$

The electrons travel through an external circuit from the anode to the cathode, providing electrical power (DC power). Overall, the operating mechanism of the fuel cell 100 results in the separation and transfer of $CO_2$ in the cathode feed into the anode exhaust stream resulting in a $CO_2$-rich stream.

Figure 2:
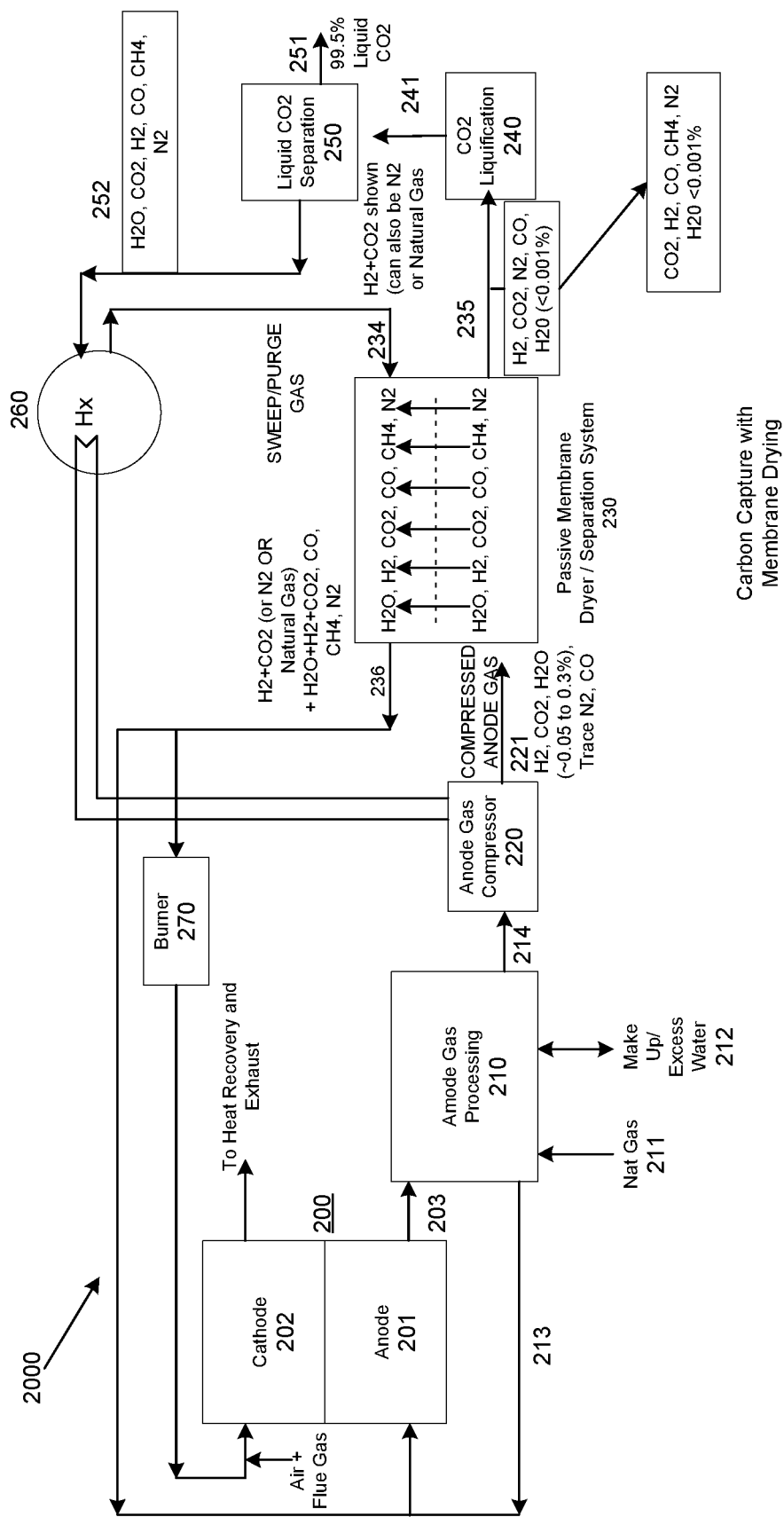
FIG. 2 illustrates a fuel cell system including a membrane dryer for removing water and hydrogen from an anode exhaust of the fuel cell of FIG. 1 prior to final purification and removal of carbon dioxide.

Referring to FIG. 2, a fuel cell system 2000 includes at least one fuel cell 200. In some aspects, the fuel cell 200 may be, for example, the fuel cell 100 of FIG. 1. Anode exhaust gas stream 203 output from the anode 201 of the fuel cell 200 is received in an anode gas processor 210. The anode gas processor 210 may include at least one anode exhaust cooler configured to decrease a temperature of the anode exhaust gas stream 203. The anode gas processor 210 may add steam to the fuel cell hydrocarbon feed stream 211. After processing, the fuel feed and steam 213 is sent to an inlet of the anode 201. Excess water condensed from the anode exhaust and not added to the fuel feed 213 may be exported in stream 212. Water may be input into the system at startup and at low power generation when insufficient water is condensed from the anode exhaust. In some aspects, the anode exhaust is sent to a shift unit as it is cooled to convert CO in the gas to $CO_2$ which increases the amount of $CO_2$ removed from the system and increases the purity of the liquid $CO_2$.

A cooled anode gas processor outlet stream 214 is fed to an anode gas compressor 220. The anode gas compressor 220 compresses the anode gas processor outlet stream 214 from 1 to 3 psig to a predetermined pressure, typically 200 to 500 psig. The compressed anode gas outlet stream 214 may be cooled by a heat exchanger 260 to remove the heat produce during compression. The anode gas compressor 220 condenses and removes additional water from the anode gas processor outlet stream 214 and output an anode gas compressor outlet stream 221. The anode gas compressor outlet stream 221 includes $H_2$, $CO_2$, $H_2O$, $N_2$ and CO. In some aspects, the anode gas compressor outlet stream 221 includes 0.05% to 0.3% $H_2O$ after it is compressed and cooled. Raw anode exhaust 203 contains about 40% water.

Figure 3:
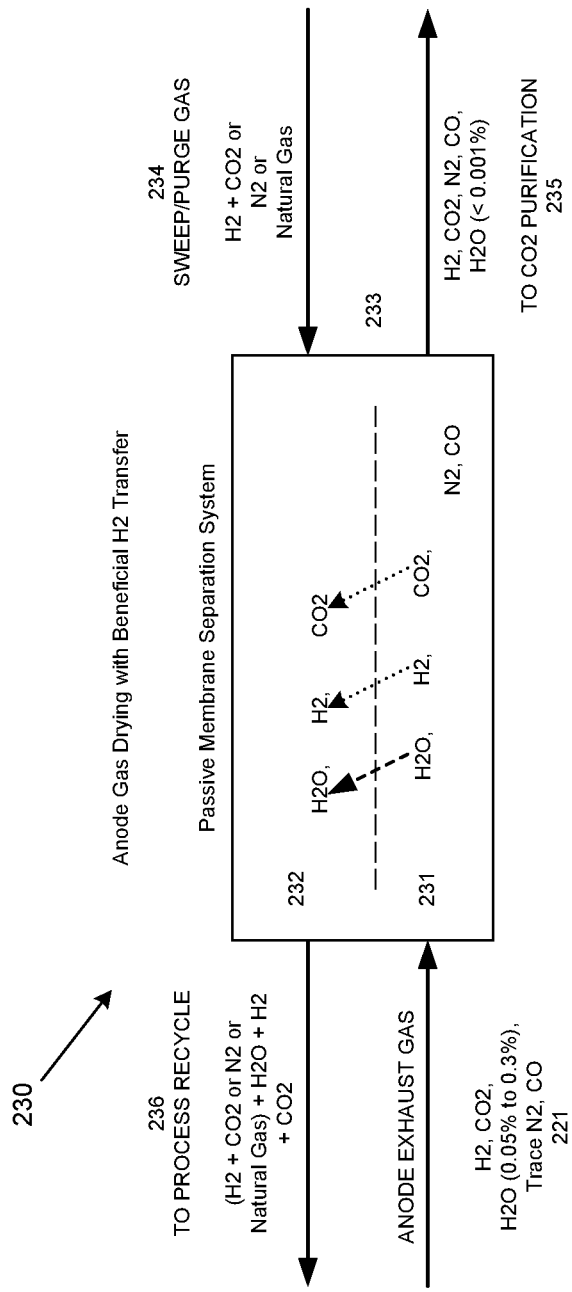
FIG. 3 illustrates the membrane dryer of FIG. 2.

The anode gas compressor outlet stream 221 is fed to a passive membrane dryer 230. Details of the passive membrane dryer 230 are illustrated in FIG. 3. As seen in FIG. 3, the passive membrane dryer 230 includes a first chamber 231 at high pressure and a second chamber 232 separated by a membrane 233 at low pressure. The anode gas compressor outlet stream 221 is received at an inlet of the first chamber 231. The membrane 233 may be semi-permeable such that the membrane 233 preferentially allows molecules of $H_2O$ to pass therethrough, and then molecules of $H_2$. In some embodiments, the membrane 233 may be semi-permeable such that the membrane 233 preferentially allows molecules of $H_2O$ in the anode gas compressor outlet stream 221 to pass therethrough, followed by other molecules in the anode gas compressor outlet stream 221 (e.g., $H_2$, $CO_2$, CO, $N_2$). In some embodiments, the membrane 233 is semi-permeable such that the membrane 233 allows molecules in the anode gas compressor outlet stream 221 to pass therethrough in the following preferential order: $H_2O$, $H_2$, $CO_2$, CO, then $N_2$ such that the molecules move from the first chamber 231 to the second chamber 232. In other words, water easily passes through the membrane 233, hydrogen passes through the membrane 233 less easily than water, carbon dioxide passes through the membrane 233 less easily than hydrogen, carbon monoxide passes through the membrane 233 less easily than nitrogen, and nitrogen passes through the membrane 233 in very small quantities. In some embodiments, membrane 233 may be semi-permeable such that the membrane 233 preferentially allows molecules of $H_2O$, $H_2$, and $N_2$ in the anode gas compressor outlet stream 221 to pass therethrough followed by $CO_2$. In other words, the membrane 233 may be less permeable to $CO_2$ compared to $H_2O$. In some embodiments, during operation, the membrane 233 may be permeable to $H_2O$ and impermeable to $CO_2$.

A passive membrane dryer outlet stream 235 includes $H_2$, $CO_2$, $H_2O$, $N_2$ and CO. In some aspects, the passive membrane dryer outlet stream 235 includes 0.001% $H_2O$. The passive membrane dryer outlet stream 235 is fed to a $CO_2$ liquefaction system 240.

While the anode gas compressor outlet stream 221 is being dried in the first chamber 231, in some aspects, an inlet of the second chamber 232 is configured to receive a sweep/purge gas stream 234. Dry purging gas is sent to chamber 232 to sweep the water from the chamber and prevent condensation. The purge lowers the water partial pressure in chamber 232 improving the membrane performance. The sweep/purge gas stream 234 may include hydrogen, carbon dioxide, nitrogen, or a hydrocarbon gas (e.g., natural gas), but should have little or no water. The sweep/purge gas stream 234 may be configured to combine with the water and hydrogen that enters the second chamber 232 (after separation from the anode gas compressor outlet stream 221 by the membrane 233) to form a process recycle stream 236. The process recycle stream 236 may include the components of the sweep/purge gas stream 234, water, hydrogen, and carbon dioxide.

The membrane dryer 230 synergistically removes both water and some hydrogen from the anode gas compressor outlet stream 221 prior to the final purification and removal of carbon dioxide. Because the membrane dryer 230 is passive, there are lower parasitic loads on the system. The transfer of water and hydrogen is promoted by the temperature, pressure, and flow of the anode gas compressor outlet stream 221 to predetermined settings for favorable recovery of $CO_2$ in the downstream processing. As a non-limiting example, desired water removal values may be about 0.06% (pre-drying) to about 0.001% (post drying).

The process recycle stream 236 may be recycled to the fuel or exported as syngas for other uses, such as chemicals production. Part of the stream must be exported to prevent buildup of nitrogen and other inerts. This blowdown stream may be sent to a burner 270 where the chemical energy in the stream is recovered as heat.

The $CO_2$ liquefaction system 240 is configured to liquefy carbon dioxide at a low temperature (approximately −50° F.). Due to the reduced amount of water (0.001%) in the passive membrane dryer outlet stream 235, a risk of the water forming an ice block during $CO_2$ liquefaction is eliminated. A $CO_2$ liquefaction outlet stream 241 is fed to a liquid $CO_2$ separator 250. The liquid $CO_2$ separator 250 separates the $CO_2$ liquefaction outlet stream 241 into a high purity, liquid $CO_2$ (e.g., 99.5% liquid $CO_2$) stream 251 to be output from the fuel cell system, and a $CO_2$-lean off-gas stream 252, which contains $H_2$, $CO_2$, $N_2$ and CO. The cold, $CO_2$-lean off-gas stream 252 is fed to a heat exchanger 260 in which the $CO_2$-lean off-gas stream 252 is heated (from approximately −50° F.) to the operating temperature of the membrane (35-100° F.) and fed as the sweep/purge gas stream 234 to the inlet of the second chamber 232. Although not shown in the figure, the cold $CO_2$-lean off gas 252 may be used to cool the compressed anode gas 221 to condense additional water in the stream. This liquid water is removed prior to feeding the gas to the dryer 230. This minimizes the size of the dryer needed.

Figure 4:
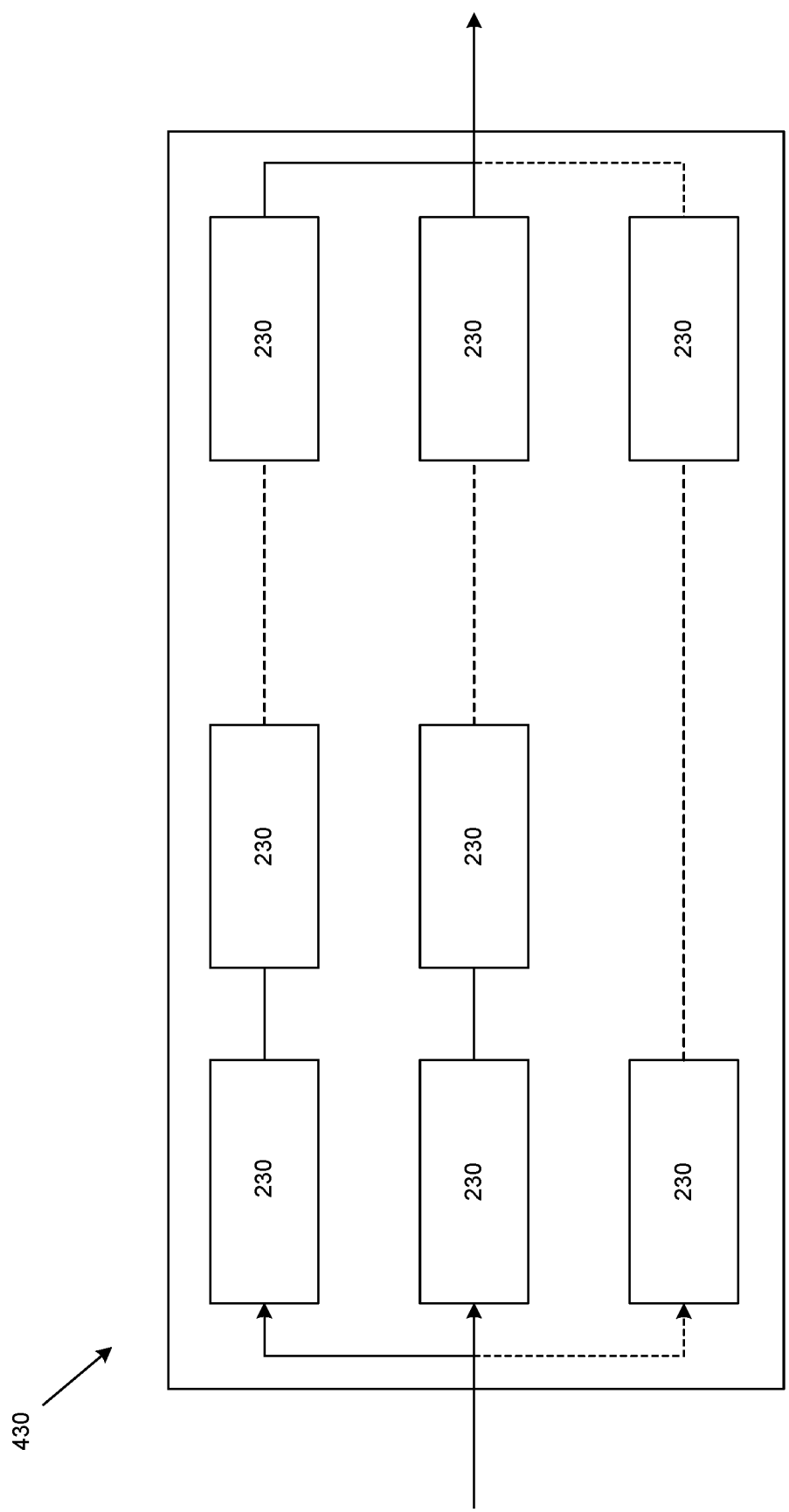
FIG. 4 illustrates a separation system including a plurality of the membrane dryers of FIG. 3.

Although the membrane dryer 230 described above is described as single membrane dryer 230, aspects of the invention are not limited in this regard. As seen in FIG. 4, the membrane dryer 230 may be replaced with a separation system 430 that includes a plurality of membrane dryers 230 arranged in series and/or in parallel.

Figure 5:
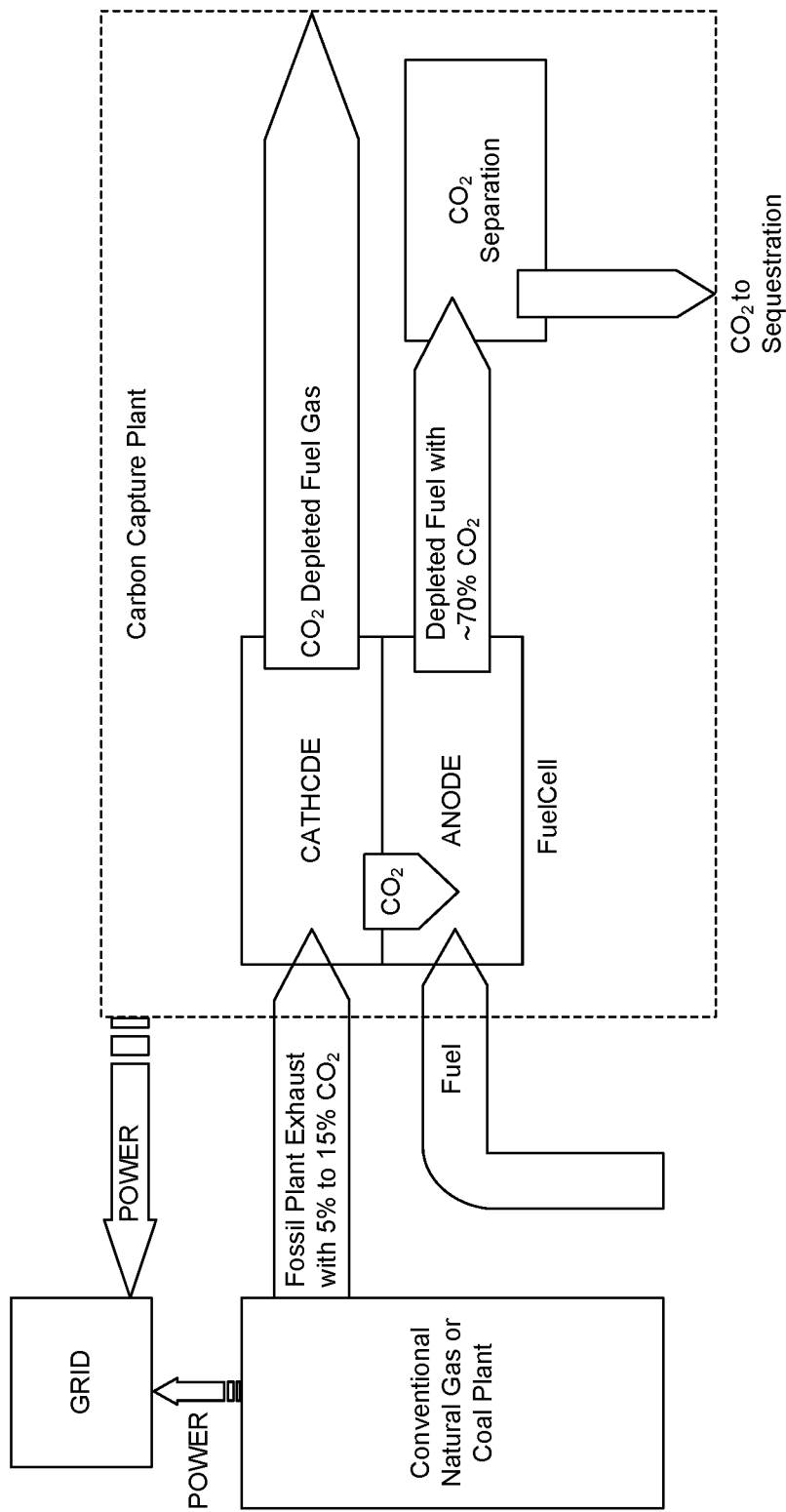
FIG. 5 illustrates an example of a fuel cell system in which the membrane dryer of FIG. 3 or the separation system of FIG. 4 may be used.
Figure 6:
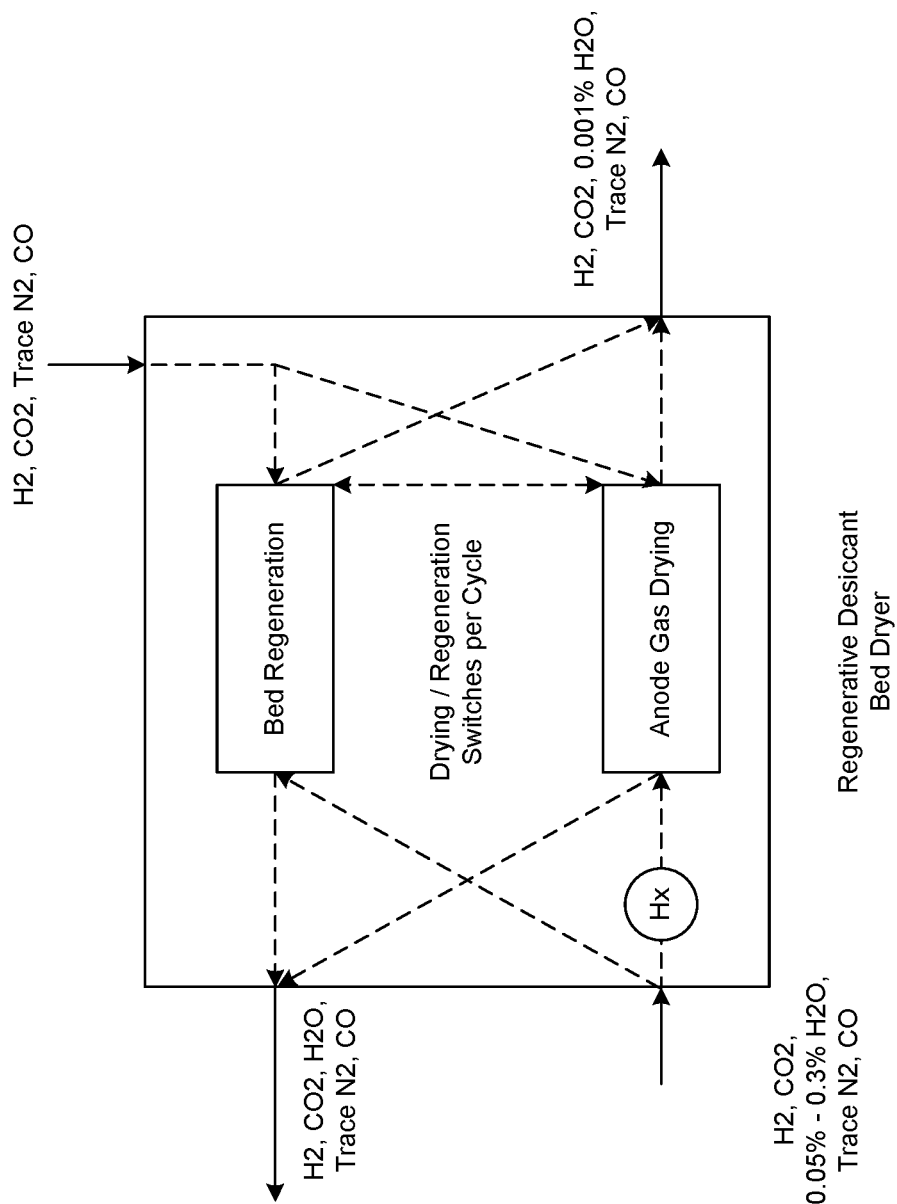
FIG. 6 illustrates a known regenerative desiccant bed dryer.

The membrane dryer 230 or the separation system 430 may be used to co-remove water and hydrogen from any anode exhaust stream. For example, the membrane dryer 230 or the separation system 430 may be used in the system of FIG. 5. As seen in FIG. 5, $CO_2$-containing flue gas from a combustion-based power plant (e.g., a coal-fired or a gas-fired power plant) is utilized as an oxidant gas for a cathode of a fuel cell. The $CO_2$ in the flue gas is used as a reactant for the electrochemical reaction to produce power (see FIG. 1), while synergistically transferring $CO_2$ from the flue gas to the anode exhaust stream. Natural gas or other fuel may be internally reformed in the fuel cell to provide the hydrogen needed to complete the electrochemical power generation cycle (see FIG. 1). The $CO_2$-rich anode exhaust gas may be processed in a balance of plant (BOP) to concentrate and compress the $CO_2$ for sequestration. The entire process generates excess water. The excess water and some of the $H_2$ in the $CO_2$-rich anode exhaust is removed by the membrane dryer 230 or the separation system 430. The stream output from the membrane dryer 230 or the separation system 430 undergoes $CO_2$ liquefaction and separation, resulting in a high purity $CO_2$ stream that is ready for compression (pumping of supercritical fluid) and sequestration. The water removed by the membrane dryer 230 or the separation system 430 may be used to provide water (steam) needed for internal reforming of methane in fuel cell fuel, eliminating the need for external process water. The $H_2$ removed by the membrane dryer 230 or the separation system 430 along with the $CO_2$-lean anode gas 252 may be recycled as part of the supplementary fuel to provide additional pre-heat in the system, thereby reducing the amount of fuel needed. The $CO_2$-lean cathode exhaust (flue gas after $CO_2$ removal) is vented to atmosphere after recovering the heat for process use (e.g., preheating of feed streams, steam generation, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fuel cell system comprising:
   an anode configured to output an anode exhaust stream comprising hydrogen, carbon dioxide, and water; and
   a membrane dryer configured to receive the anode exhaust stream, remove water from the anode exhaust stream, and output a membrane dryer outlet stream, the membrane dryer comprising:
      a first chamber configured to receive the anode exhaust stream and to output the membrane dryer output stream,
      a second chamber configured to receive a purge gas having a lower concentration of water than the anode exhaust stream, and to output a process recycle stream, and
      a semi-permeable membrane separating the first chamber and the second chamber,
   wherein the semi-permeable membrane is configured to allow water and hydrogen to diffuse therethrough, thereby removing water and hydrogen from the anode exhaust stream;
   wherein the membrane dryer is configured such that the process recycle stream output from the second chamber comprises the purge gas, hydrogen that diffused through the semi-permeable membrane, and water that diffused through the semi-permeable membrane.

2. The fuel cell system of claim 1, further comprising a carbon dioxide liquefaction system configured to liquefy carbon dioxide in the membrane dryer outlet stream.

3. The fuel cell system of claim 2, further comprising a liquid carbon dioxide separator configured to separate liquefied carbon dioxide from the membrane dryer outlet stream, thereby producing a carbon dioxide-lean off gas stream and a high purity liquid carbon dioxide stream.

4. The fuel cell system of claim 3, further comprising a heat exchanger configured to heat the carbon dioxide-lean off gas stream and introduce the heated, carbon dioxide-lean off gas stream into the membrane dryer as the purge gas.

5. The fuel cell system of claim 2, further comprising a heat exchanger configured to cool the anode exhaust stream to the membrane dryer to above the freezing temperature of water, with a system to remove liquid water and minimize the amount of water fed to the membrane dryer.

6. The fuel cell system of claim 1, further comprising an anode gas compressor located downstream of the anode,
   wherein the anode gas compressor is configured to compress the anode exhaust stream upstream of the membrane dryer.

7. The fuel cell system of claim 1, further comprising at least one additional membrane dryer.

8. The fuel cell system of claim 7, wherein the membrane dryer and the at least one additional membrane dryer are connected in parallel.

9. The fuel cell system of claim 7, wherein the membrane dryer and the at least one additional membrane dryer are connected in series.

* * * * *

UNITED STATES PATENT AND TRADEMARK OFFICE
CERTIFICATE OF CORRECTION

PATENT NO. : 11,201,337 B2
APPLICATION NO. : 16/229285
DATED : December 14, 2021
INVENTOR(S) : Jolly et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this
Thirty-first Day of January, 2023

Katherine Kelly Vidal
*Director of the United States Patent and Trademark Office*